W. COMBS.
Seed-Planter.

No. 31,076.

Patented Jan. 8, 1861.

Witnesses:
William Jacobus
Randolph Coyle Jr.

Inventor:
William Combs.
By his Atty
Amas Broadnay

UNITED STATES PATENT OFFICE.

WILLIAM COMBS, OF DUQUOIN, ILLINOIS.

IMPROVEMENT IN CORN-PLANTERS.

Specification forming part of Letters Patent No. 31,076, dated January 8, 1861.

*To all whom it may concern:*

Be it known that I, WILLIAM COMBS, of Duquoin, county of Perry, and State of Illinois, have invented a new and useful Improvement in Corn-Planters; and I do hereby declare that the following is a full, clear, and exact description of the same, reference being had to the annexed drawings, making part of this specification, in which—

Figure 1:
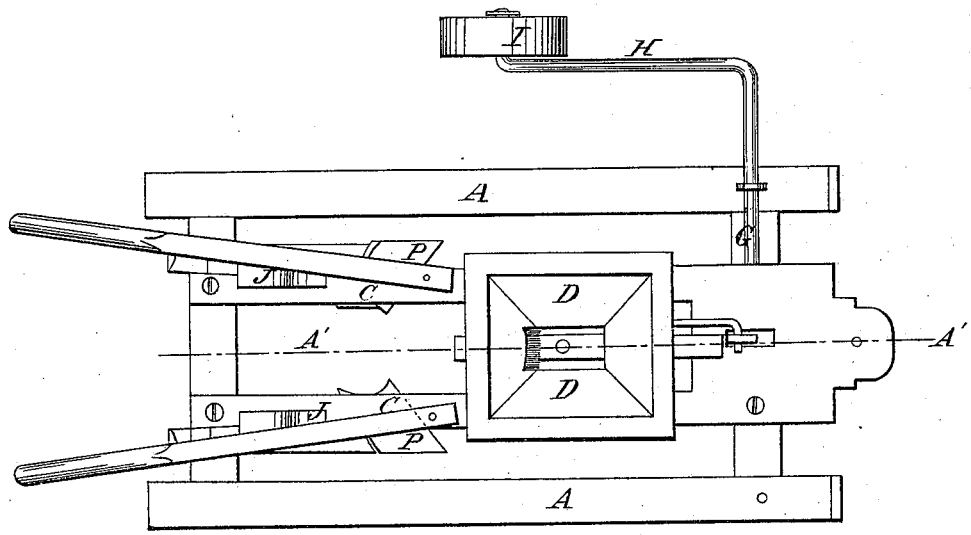
Figure 2:
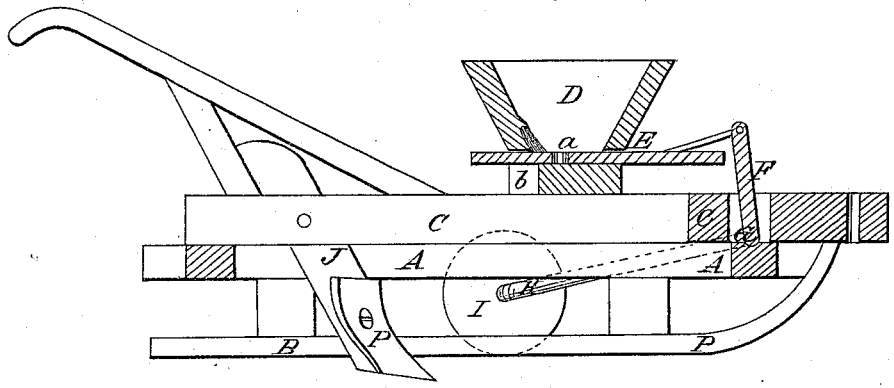

Figure 1 is a top view of my improved planter. Fig. 2 is a section on the line A' A'.

This invention is an improvement in automatic corn-planters.

The following description will enable any one skilled in the arts to make and use the said invention.

Similar letters of reference represent corresponding parts of the different figures in the drawings.

In the drawings, A represents the frame of my machine, which in construction is similar to a common sleigh, the runners whereof are represented by B. Upon this frame a pair of parallel beams, C C, are affixed, upon which the hopper-box D is fixed, in the bottom of which is the drop-valve E, which is operated by means of a lever, F, fixed on a shaft, G, arranged across the front of the frame, as shown, and which is made with a crank or lever end, as shown by H, upon which crank or lever end the roller I is placed. To the rear end of the parallel beams the plow-stocks J J are fixed, with a right and left plow, respectively. Now, let the furrows be struck one way; the roller I, as it crosses the made furrows, will fall in them, and thus operate the valve E through the agency of the levers to which it is attached, as above described. The valve receives the corn at $a$ and discharges it at $b$ when it moves back. The plows P are gaged by the runners B, which keep them from going too far in the ground.

I claim as my invention—

The arrangement of the shaft G with the sleigh, the ground, the hopper-box D, and the lever F in the relation described, for the purpose specified.

WM. COMBS.

Witnesses:
EDWIN P. CAVETT,
ROLLIN B. GRAY.